Patented July 2, 1929.

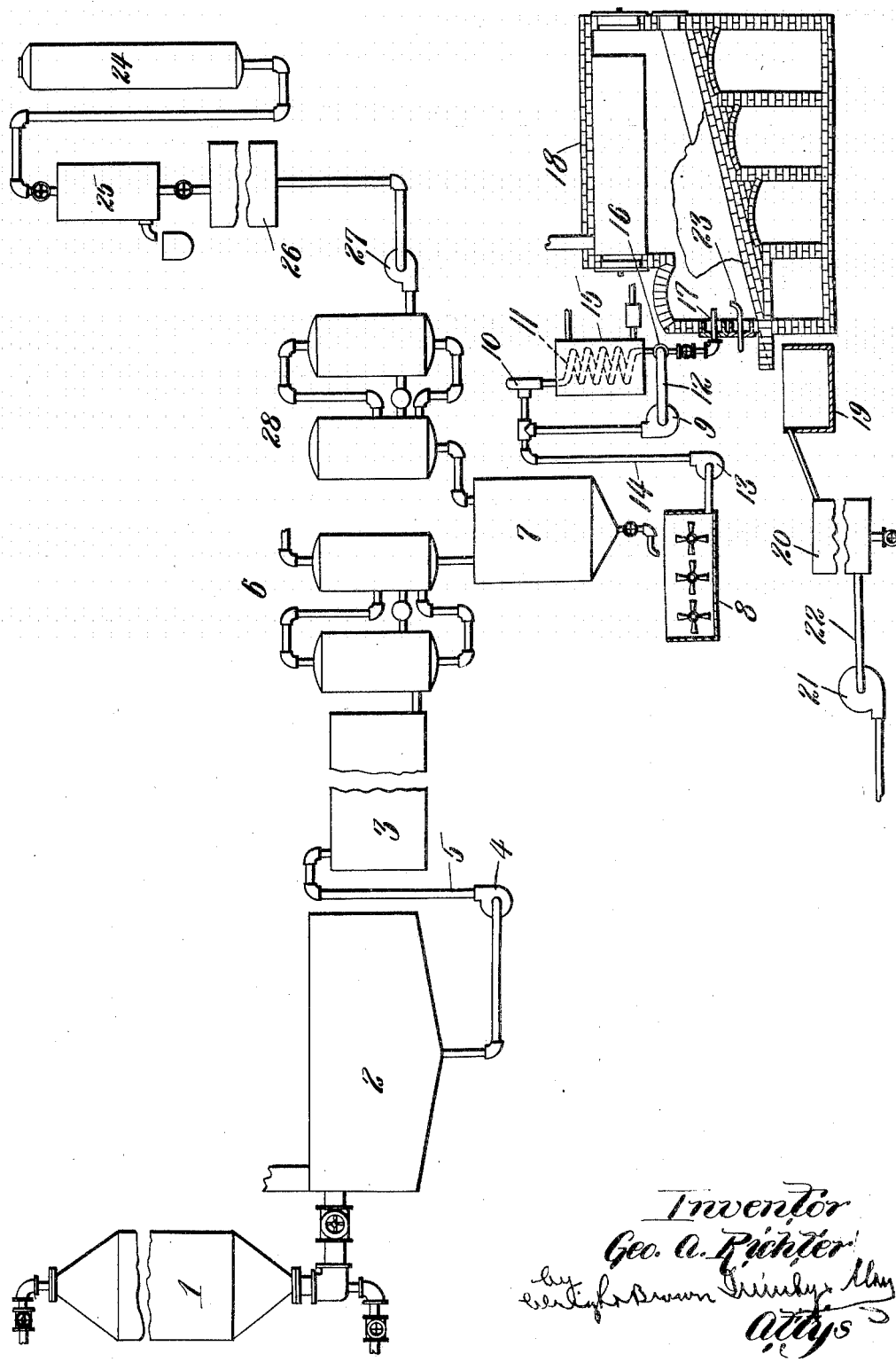

1,719,129

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF FIBER LIBERATION AND RECOVERY OF VALUABLE CONSTITUENTS OF THE WASTE LIQUOR.

Application filed October 28, 1922. Serial No. 597,525.

This invention has relation to the digestion of wood for the production of cellulose fiber, such as employed in the manufacture of news print, writing paper or the like.

In the manufacture of chemical wood pulp, so-called, three processes have largely been used, denominated more or less aptly by the terms "sulphite", "sulphate" and "soda" processes. In the "sulphite" process, the cooking liquor consists of calcium or magnesium bisulphite with more or less free sulphurous acid. In the "sulphate" process, so-called, the cooking liquor consists essentially of a solution of sodium sulphide (reduced from sodium sulphate) and sodium hydroxide. In the "soda" process, so-called, the cooking liquor consists essentially of sodium hydroxide solution.

It is not known precisely what function is performed by the sulphite in the cooking liquor. It is ordinarily assumed that the free sulphurous acid present in the solution hydrolizes the wood, and that during hydrolysis a free organic acid is formed, which, if undisturbed, causes further decomposition of the cellulose produced. The apparent function of the base in solution is to react with this free organic acid, thereby removing it from the field of action. Where the wood is subjected only to the action of sulphuric or sulphurous acids, the action is so violent as to char or injure the cellulose, and yet a certain amount of sulphurous acid is necessary in the cooking liquor for the hydrolizing action referred to. When a cooking liquor is employed, which consists of a base such as calcium or magnesium and free sulphurous acid, the recovery of the constituents from the waste liquor is a serious problem and is costly to carry out. As a result, it is the custom commercially to discharge the waste liquors into streams, thereby polluting the water. Various attempts have been made to utilize the waste liquor resulting from the sulphite process and to some extent the waste sulphite liquor is utilized, but, in actual practice, it is no exaggeration to say that practically all of the waste sulphite liquor is discharged into running water such as the rivers and streams, which are injured thereby.

In my application Serial No. 446,574, filed February 21, 1921, resulting in Letters Patent No. 1,427,125, issued August 29, 1922, I have disclosed a new method of digesting wood for the liberation of cellulose fibers, by employing in the production of the liquor a soluble sulphate, preferably a sulphate of the alkaline or alkaline earth groups (e. g. the sulphates of sodium, magnesium, potassium, zinc, lithium, etc.) dissolved in a sulphurous acid solution.

In actual practice, sodium sulphate, for example, may be dissolved in water to produce a solution of say 3% to 5%, and through this solution $SO_2$ is bubbled until the resulting acid solution contains free sulphurous acid from 2% to 7%, or preferably about 4% sodium sulphate and 5% sulphur dioxide.

In the digestion of the wood, the same procedures may be followed as in the cooking of the wood in a calcium bisulphite solution, and, when the digester is blown, the $SO_2$ may be recovered from the cooking liquor by known approved processes. Instead of discharging the waste liquor from the blow pit into adjacent streams, however, it is collected in a suitable tank, and, after being neutralized with sodium carbonate, then by the process described in the Moore and Quinn Patent No. 1,326,414, the liquor is more or less evaporated and concentrated and then burned in a combined smelting and boiler furnace for the recovery of the sulphate by supplying an oxidizing atmosphere adjacent the molten mineral constituent.

According to the present invention, the sodium-sulphur compound may be recovered as sodium sulphate or sodium sulphide, and used for the production or enrichment of the alkaline liquor employed in the "sulphate" or sulphide process of fiber liberation. This is accomplished by maintaining either an oxidizing or a reducing atmosphere adjacent to the molten mineral in the reducing furnace.

Further, the invention also comprises the recovery of the inorganic content of waste alkaline liquor of the sulphate process and also the inorganic content of the waste acid liquor resulting from the liberation of fiber by the sodium sulphate-sulphite solution first herein referred to, simultaneously in a retort, as sodium sulphide. On the other hand, if an oxidizing atmosphere is maintained as hereinafter specified, the molten mineral from the furnace consists essentially of sodium sulphate, sodium sulphite, and sodium carbonate. This solution may be acidified, as previously indicated, with sulphur dioxide to produce a sulphurous acid solution of sodium sulphate and sodium sulphite, which may be employed as an acid digesting liquor. This is preferably accomplished by concentrating both solutions and then mixing and burning the combustible content and smelting the inorganic content thereof in a suitable retort, such as the combined boiler furnace and retort described in the Moore and Quinn patent hereinbefore identified.

On the accompanying drawing, I have shown diagrammatically and conventionally some of the several instrumentalities which may be utilized in carrying out my process.

1 indicates a digester in which the acid sodium sulphate solution is utilized in the cooking process for the liberation of pulp from cellulosic material, 2 the blow-pit, 3 a storage tank for the waste liquor pumped thereto by pump 4 through pipe 5, and in which it is neutralized by sodium hydroxide or sodium carbonate. 6 indicates a multiple-effect evaporator for the neutralized acid liquor, which, when sufficiently concentrated, is delivered to tank 7 from which it is drawn as needed into a mixer 8. A circulating system, comprising pumps 9, 10, coil 11, piping 12 and manifold 16, receives the liquor forced by pump 13 through pipe 14 from the mixer 8. A heater 15 heats the liquor to a high degree of temperature, to generate an explosive force in the liquor, so that, when it is liberated from the manifold 16 through nozzles 17 into the combustion chamber of the retort (indicated as a whole at 18 and preferably consisting of a combined retort and boiler furnace), the combustible content may be consumed and the molten sodium-sulphur compounds recovered. The molten effluent is received in an aqueous body, held in a collecting tank 19, and is dissolved therein. The overflow from tank 19 is received in a storage tank 20, from which it may be removed by pump 21 through pipe 22. The combustion chamber in retort 18 may have air delivered thereto through one or more nozzles 23, in sufficient quantity to support combustion and preferably permit the maintenance of a reducing atmosphere at the bottom of the chamber in contact with the molten sodium-sulphur compounds, so that the latter will be discharged mainly as sodium sulphide.

According to one feature of my invention, whether the sodium-sulphur compound be recovered as sulphate or as sulphide, it may be employed in the formation of an alkaline liquor for the liberation of pulp by the sulphide or "sulphate" process so-called. If recovered as sulphate, it may be mixed with the "black liquor" prior to the subjection of the latter to a smelting operation, or, if recovered as sulphide, it may be used as such in solution, or delivered to the usual causticizing tanks for the enrichment of the liquor in the "sulphate" process. Or both may be recovered simultaneously in an oxidizing atmosphere and then acidified with sulphur dioxide to produce an acid solution which may be employed as an acid digesting liquor for the production of sulphite pulp, as previously indicated.

On the drawing, however, I have shown at 24 a digester for liberating pulp from cellulosic material by the alkaline "sulphate" process, and 25 indicates a pulp separator from which the alkaline waste black liquor flows to a collecting tank 26, whence it is pumped by pump 27 to a multiple-effect evaporator 28 and concentrated to the desired extent. Then the concentrated black liquor may be delivered to the storage tank 7 previously referred to and be commingled with the waste concentrated neutralized acid liquor from the blow-pit 2.

When these two liquors are now liberated in the retort, the sulphur-sodium compounds in both are recovered mainly as sodium sulphide. Thus the sodium sulphate of the waste neutralized acid liquor makes up for the losses incurred in the regular operation of the alkaline sulphide process, and supplies a cooking liquor rich in sodium sulphide.

When sulphate and sulphide pulps are being produced in the same or in adjacent plants, the sequence of steps of my process, as herein described, makes for marked economy, as practically all the "make up" chemicals necessary for both processes are sodium carbonate or sodium hydroxide, and sulphur,—with, if necessary, lime for use in the causticizing tanks.

In accordance with the present invention, I recover the sulphur and sodium from the lignin compounds, in the form of inorganic sodium-sulphur combinations, and utilize the latter in producing the sulphide liquor and in the consequent manufacture of "sulphate pulp". Thus the sodium-sulphur compounds used in the acid sulphite-sulphate process perform a double duty.

In preparing the acid cooking liquor, it is evident that (1) sulphur dioxide produced by burning sulphur may be passed through a sodium carbonate solution for the formation of sodium sulphite, or (2) the sulphur dioxide may be absorbed in a sodium sulphate solution, or (3) sulphur dioxide may be passed through a solution of sodium sulphate and a sodium alkali such as sodium carbonate and/or sodium hydroxide. Likewise in preparing the alkaline cooking liquor, one may practice the process described in my Letters Patent No. 1,427,125, dated August 29, 1922, by adding to the waste black liquor sulphur and/or sodium carbonate. Consequently, for the acid process of digestion and the alkaline or "sulphate" process, one may employ as the raw materials in the preparation of both the acid and the alkaline liquors, sulphur, sodium carbonate and/or sodium sulphate. In any case, as previously outlined, the inorganic content of the waste acid liquor is recovered as sodium sulphate or sodium sulphide according to whether the atmosphere in the furnace be oxidizing or reducing in character.

In the event that the acid process should be discontinued temporarily, or that the waste liquor therefrom should be insufficient in volume, sodium sulphate may be supplied to the mixer 8, to make up for the losses in the caustic-soda-sulphide liquor in the recovery of the inorganic content thereof. Sodium carbonate may be added to mixer 8 to neutralize the acid of the sulphite solution.

A very decided advantage flowing from the process as herein outlined is that of economy in the production of both sulphite and "sulphate" pulps, the one by the use of an acid liquor and the other by the use of an alkaline liquor, since the reuse of the sodium and sulphur enables the employment of the sodium base in the sulphite process, and since the carbonaceous residuum of the liquors of both processes furnish heat for use in the generation of steam.

It is preferable, although not strictly necessary, that the concentrated liquors should be delivered to the same furnace, for usually there is a battery of furnaces for consuming the carbonaceous content and smelting and recovering the mineral content of a liquor depending upon the number of digesters and the volume of the liquor, so that certain of the furnaces could be employed for the waste sulphite liquor and others for the waste alkaline liquor, and the smelts from both could be directed into the same recovery tank.

What I claim is:—

1. A process which comprises smelting in a reducing atmosphere the inorganic content of a concentrated mixture of the waste acid liquor resulting from digestion of cellulosic material in a sulphurous acid solution of sodium-sulphur salts and waste alkaline liquor resulting from digestion of cellulosic material in a solution containing sodium compounds, and recovering the smelt in aqueous solution for the alkaline digestion of raw cellulosic material.

2. A process which comprises smelting in a reducing atmosphere the inorganic content of a concentrated mixture of the waste acid liquor resulting from digestion of cellulosic material in a sulphurous acid solution of sodium sulphate and waste alkaline liquor resulting from digestion of cellulosic material in a solution containing sodium compounds, and recovering the smelt in aqueous solution for the alkaline digestion of raw cellulosic material.

3. A process which comprises smelting in a reducing atmosphere the inorganic content of a concentrated mixture of the waste acid liquor resulting from digestion of cellulosic material in a sulphurous acid solution of sodium sulphate and waste alkaline liquor resulting from digestion of cellulosic material in a solution containing sodium sulphide, and recovering the smelt in aqueous solution for the alkaline digestion of raw cellulosic material.

4. A process which comprises evaporating and concentrating (1) the waste acid liquor resulting from the liberation of pulp by digesting raw cellulosic material in a sulphurous acid solution of sodium-sulphur salts, (2) the waste alkaline liquor resulting from the liberation of pulp in an alkaline liquor containing sodium compounds, mixing and simultaneously burning the combustible content and smelting the inorganic content of both liquors in a reducing atmosphere to produce sodium sulphide, and recovering the smelt in aqueous solution for the alkaline digestion of other raw cellulosic material.

5. A process which comprises evaporating and concentrating (1) the waste acid liquor resulting from the liberation of pulp by digesting raw cellulosic material in a sulphurous acid solution of sodium sulphate, (2) the waste alkaline liquor resulting from the liberation of pulp in an alkaline liquor containing sodium compounds, mixing and simultaneously burning the combustible content and smelting the inorganic content of both liquors in a reducing atmosphere to produce sodium sulphide, and recovering the smelt in aqueous solution for the alkaline digestion of other raw cellulosic material.

6. A process which comprises evaporating and concentrating (1) the waste acid liquor resulting from the liberation of pulp by digesting raw cellulosic material in a sulphurous acid solution of sodium sulphate, (2) the waste alkaline liquor resulting from the liberation of pulp in an alkaline liquor containing sodium sulphide, mixing and simultaneously burning the combustible content and smelting the inorganic content of both liquors in a reducing atmosphere to produce sodium sulphide, and recovering the smelt in aqueous solution for the alkaline digestion of other raw cellulosic material.

7. A process which comprises evaporating and concentrating (1) the waste acid liquor resulting from the liberation of pulp by digesting raw cellulosic material in a sulphurous acid solution of sodium sulphate, (2) the waste alkaline liquor resulting from the liberation of pulp in an alkaline liquor containing sodium compounds, mixing and simultaneously burning the combustible content and smelting the inorganic content of both liquors, and recovering the smelt in aqueous solution.

8. A process which comprises evaporating and concentrating (1) the waste acid liquor resulting from the liberation of pulp by digesting raw cellulosic material in a sulphurous acid solution of sodium sulphate, (2) the waste alkaline liquor resulting from the liberation of pulp in an alkaline liquor containing sodium sulphide, mixing and simultaneously burning the combustible content and smelting the inorganic content of both liquors, and recovering the smelt in aqueous solution.

9. A process which comprises smelting in a reducing atmosphere the inorganic content of a concentrated mixture of the waste acid liquor resulting from digestion of cellulosic material in a sulphurous acid solution of sodium sulphur salts and waste alkaline liquor resulting from digestion of cellulosic material in a solution containing sodium compounds, recovering the smelt in aqueous solution, and causticizing the solution for the alkaline digestion of raw cellulosic material.

In testimony whereof I have affixed my signature.

GEORGE A. RICHTER.